(12) United States Patent
Kejriwal

(10) Patent No.: US 8,642,103 B2
(45) Date of Patent: Feb. 4, 2014

(54) PROCESS FOR PREPARING CHEWABLE HONEY WITHOUT LOSS OF ITS NUTRITIONAL VALUES AND HONEY CHEW BAR OBTAINED THROUGH SUCH PROCESS

(76) Inventor: Prakash Kejriwal, New Delhi (IN)

( * ) Notice: Subject to any disclaimer, the term of this patent is extended or adjusted under 35 U.S.C. 154(b) by 298 days.

(21) Appl. No.: 12/812,636

(22) PCT Filed: Sep. 26, 2008

(86) PCT No.: PCT/IN2008/000618
§ 371 (c)(1),
(2), (4) Date: Aug. 13, 2010

(87) PCT Pub. No.: WO2009/090668
PCT Pub. Date: Jul. 23, 2009

(65) Prior Publication Data
US 2010/0303963 A1      Dec. 2, 2010

(30) Foreign Application Priority Data
Jan. 14, 2008   (IN) .............................. 108/DEL/2008

(51) Int. Cl.
*A23L 1/08*    (2006.01)
(52) U.S. Cl.
USPC ........................... 426/471; 426/658; 426/465
(58) Field of Classification Search
CPC ....................................................... A23L 1/08
USPC ........................ 426/471, 492, 650, 658, 465
See application file for complete search history.

(56) References Cited

U.S. PATENT DOCUMENTS

|  |  |  |  |  |
|---|---|---|---|---|
| 752,359 | A * | 2/1904 | Reed .............................. | 426/658 |
| 1,694,680 | A * | 12/1928 | Burton et al. .................. | 426/581 |
| 1,892,902 | A * | 1/1933 | Rasky ........................... | 426/581 |
| 1,908,454 | A * | 5/1933 | Snider ........................... | 426/658 |
| 2,021,450 | A * | 11/1935 | Hampton ........................ | 127/30 |
| 2,690,972 | A * | 10/1954 | Bradshaw ...................... | 426/658 |
| 2,693,420 | A * | 11/1954 | Straub ........................... | 426/618 |
| 4,004,040 | A * | 1/1977 | Puta .............................. | 426/564 |
| 4,472,450 | A | 9/1984 | Platt, Jr. et al. | |
| 4,532,143 | A * | 7/1985 | Brain et al. ................... | 426/577 |
| 5,356,650 | A * | 10/1994 | Kanayama .................... | 426/396 |
| 7,101,582 | B2 * | 9/2006 | Green ........................... | 426/494 |
| 2003/0096054 | A1 | 5/2003 | Green | |
| 2012/0034309 | A1 * | 2/2012 | Rowe ............................ | 424/537 |

FOREIGN PATENT DOCUMENTS

| FR | 1 030 803 A | 6/1953 |
|---|---|---|
| GB | 1 378 104 A | 12/1974 |
| IL | 75 112 A | 9/1988 |
| JP | 2007-189956 A | 8/2007 |

OTHER PUBLICATIONS

International Search Report of PCT/IN2008/000618, dated Feb. 5, 2009.
International Food Information Service (IFIS), Frankfurt-Main, DE; 1999, Estupinan S et al: "Quality parameters of honey. II. Chemical composition. A review." Abstract, 2 pgs.

\* cited by examiner

*Primary Examiner* — Steven Leff
(74) *Attorney, Agent, or Firm* — Hoffmann & Baron, LLP

(57) ABSTRACT

A process for the preparation of chewable honey without loss of its nutritional values and a honey chew bar obtained through such process, said chewable honey bar providing sustained energy to the consumer without loss of nutritional values and flavor of natural honey. During the process, an additional flavor may be added, comprising of additives, natural flavor, artificial flavor and nature identical flavor for example being selected of strawberry, vanilla, coffee, chocolate, rose, cloves or any other such flavor to the Honey.

8 Claims, No Drawings

PROCESS FOR PREPARING CHEWABLE HONEY WITHOUT LOSS OF ITS NUTRITIONAL VALUES AND HONEY CHEW BAR OBTAINED THROUGH SUCH PROCESS

FIELD OF INVENTION

The object of the present invention is a process for the preparation of chewable honey without loss of its nutritional values and a honey chew bar obtained through such process, said chewable honey bar providing sustained energy to the consumer without loss of nutritional values and flavour of natural honey.

BACKGROUND

There is a known need for balanced natural nutritional food bars which can provide a more sustained energy, one which lasts between regular meals over periods of one to two hours, and which avoids the energy drop associated with the quick energy provided by candy bars. While consumers are concerned about health, many are unwilling to sacrifice taste to achieve good health.

There exists therefore a need in the commerce for a food bar which has the taste, texture, and appeal of a good tasting chew bar but which is more nutritious than a candy bar. There exists a need in the art for a food bar capable of supplying nutrients and sustained energy while providing a desirable good taste.

There are practically no patents claiming any natural nutritional honey chew bar obtained from a natural honey. On the other hand, there are few documents concerning a process for concentrating and obtaining a chewable honey mass. Those documents do not mention any particular process which could make available the production of the chewable honey bar mentioned above without loss of its nutritional values and flavour.

Regarding a natural nutritional honey chew bar, WO9803074 discloses a solidified product obtained from honey or fruit juice, with a hardness comparable to that of hard candy and less likely to stick to the teeth, which does not deform. JP2207762 relates to a product consisting of concentrated pure honey for carrying and handling convenience by packing vacuum evaporated honey.

None of the referenced documents reveal any features which provide for conservation of the labile components, nutritional properties and superior taste, mouth feeling (sensation) and organoleptic acceptance of natural honey.

Regarding honey evaporation concentration processes, WO9803074 reveals removing water from the honey or fruit juice while heating at 100° C. or above under reduced pressure to prepare a solidified product having a water content of not more than 3%. After the solidification, the product is molded in a dry atmosphere having a humidity of not more than 55% into mouldings having a size not larger than a mouthful, which are then hermetically sealed in a package one by one with an aluminum foil or the like in the same dry atmosphere. But from the employed one-step high thermal conditions and extreme final evaporation one must conclude again that degradation of valuable organic components occurs. JP2207762 discloses a process for removing water from pure honey at temperatures within a range from the ordinary temperature up to 40-90° C. and during 1 hr or less by using a vacuum evaporator. The resultant concentrated honey is poured into a-shaped part of a packing vessel of a heat-resistant plastic preliminarily coated with a prescribed amount of an edible oil and fat (e.g. coconut oil) and spontaneously cooled to be formed into a solidified honey. The opening part side of the vessel is then covered and sealed using an aluminum foil or a sheet 18 free from moisture absorption, thus obtaining the object product. Herein, focus is placed on solidify and packing natural honey into a solid product. From the poor heat transfer and long honey residence time occurring in the used vacuum evaporator one must conclude again that degradation of valuable organic components occurs.

Other documents in the prior art refer to viscous fluids evaporation and/or concentration processes. Document WO9718023 describes a rotating heat transmission body with system for scraping the evaporation surface. Said document reveals a rotating heat transmission body for drying of pumpable viscous products, and useful in case of evaporation of solutions that form deposits on the evaporation surface. The heat transmission body is constructed as a rotor with a cylindrical supporting mid-section that functions to lead the heating vapour stepwise forward to a large number of disc-shaped ring channels during condensation of the vapour and at the same time lead condensate and false air away from these. For drying, the heat transmission body is mounted with a vertical axis and horizontal evaporation surfaces that allow application of thicker layers of moist product, which can be scraped off after drying with subsequent application of new product with aggregates that each can serve a number of jointly running heat transmission surfaces. One must to suppose the over-heating of such labile nutritional components as present in natural honey.

Of course many other state of the art patents claim different processes leading to solidified products from heavy viscous fluids. But differences with respect to the object of the present invention regarding thermal stability of labile honey components render them unsuitable for the object of the Invention, which requires mild conditions suited to honey evaporation in order to preserve in the chewable bar the superior taste, mouth feeling (sensation) and organoleptic acceptance of natural honey.

Therefore there is a need for a new product—a non-cooked, ready to eat chewable bar obtained from natural nutritional honey, and a preparation process thereof. Such a process and product are claimed in claims 1 and 7.

DESCRIPTION OF THE INVENTION

The present invention discloses a process for the preparation of chewable honey without loss of its nutritional values, said process comprising the steps of:

preheating and homogenizing raw honey to obtain honey of uniform consistency with viscosity levels suitable for making the honey pumpable;

passing the honey through a sparkler filter to give honey sparkling clarity;

pumping the honey to a feeder tank;

pumping the honey to a honey scrapped surface/thin film evaporator (4) at a strictly controlled flow rate, in order to reduce water content;

repeating the steps a) to d) a number of times in a loop to achieve the desired moisture levels of the honey chew;

continuously checking the inlet moisture content of honey going in through the feeder pump and the moisture content of the honey coming out of the discharge pump at least at 5 minutes intervals in order to monitor evaporation progress.

Optionally, either prior to (e.g. between preheating and passing the honey through a sparkler filter) or during the steps of the process wherein the water content is reduced (e.g. between pumping the honey to a feeder tank and pumping the honey to a honey scrapped surface/thin film evaporator), some flavour may be added to the Honey comprising of additives, natural flavour, artificial flavour and nature identical flavour for example being selected of strawberry, vanilla, coffee, chocolate, rose, cloves, or any other similar fragrance etc.

The process is ended when the water content is 5-15%, preferably 11-15%, more preferably 8-10%.

The following process parameters have to be monitored:

the product temperature i.e. the temperature of raw honey which is used as raw material for the chew bar.

the inlet & outlet temperature of the water which is used to indirectly heat the honey.

the inlet & outlet temperature of cold water which is used to condensate moisture that has evaporated and the pressure for the same.

the micro valve settings which is used to control the exact honey flow rate to achieve the right moisture.

the vacuum pressure inside the shell so that the boiling point of honey can be reached at a lower temperature.

In the above process, the following equipment is involved:
1—Raw honey preheater: a double jacketed balance tank indirectly heated with a stirrer used to achieve right honey viscosity levels
2—Honey filter: a sparkler filter with a 550 micron bed to give honey sparkling clarity.
3—Honey feeder: a tank feeding honey into the evaporator apparatus
4—Honey evaporator: a cycle scrapped surface/thin film evaporator used to provide high degree of agitation, effective heat transfer, as well as honey scrapping from evaporator walls to prevent deposition and subsequent charring of the honey.
5—Measuring and control instrumentation for the process: continuous monitors and controllers of moisture levels in honey inlet to, and outlet from, cycle scrapped surface/thin film evaporator; controllers of evaporator pressures and differential temperatures of said evaporator inlet & outlet hot and cold water; said instruments performing controls at rigorously specified short minutes time intervals; as well as a careful control within specified ranges of honey residence time by means of feeding honey flow micro valves settings.

The present invention also discloses a product obtained through the process of the invention. Said product is a chewable bar obtained from a natural honey, that is, not a simple honey candy bar. The present invention provides a non-cooked, ready to eat natural nutritional honey chew bar, which is a sustained source of carbohydrates and other organic substances. Its composition, on average, is 5-15% water, preferably 11-15%, more preferably 8-10% water, 85-95%, preferably 85-89%, more preferably 90-92% non-degraded carbohydrates and trace amounts of amino acids, vitamins and minerals. Said chew bar also contains other valuable non-degraded substances like proteins, hormones, organic acids, and anti-microbial compounds. The flavour, aroma and texture of the natural honey confer a superior taste, mouth feeling (sensation) and organoleptic acceptance to the honey chew bar.

DESCRIPTION OF A PREFERRED EMBODIMENT OF THE INVENTION

Raw honey at a moisture level of 19% is preheated in a double jacketed balance tank (1). Honey is indirectly heated and homogenized with a stirrer in order to achieve right honey viscosity levels, which make it pumpable.

The honey is then passed through a sparkler filter (2) with a 550 micron bed to give honey sparkling clarity and then pumped to the feeder tank (3).

The honey is pumped to the honey scrapped surface/thin film evaporator (4) at a strictly controlled flow rate. It is relevant that the honey should be pumped into the evaporator shell at velocity that ensures the desired heat transfer rate.

In the evaporator (4) the honey will be at a reduced pressure set to approximately 650 mm of Hg, and an inlet hot water temperature at 85° C., the cooling water temperature is maintained at a range of 20-22° C. with a minimum pressure of 2 kg. Care must be taken for avoiding honey overheating and the evaporator scrapper could make a thin film of honey inside the shell thus leading to better heat transfer and surface area for evaporation. The water thus evaporated is again collected through the process of condensation. Then the honey is recycled to perform the next evaporation cycle.

During honey evaporation there is performed carefully control that in a single evaporation cycle not more than 2% of moisture should be extracted from honey, and that product temperature should not allowed going above 60° C. The process is repeated a number of cycles to achieve the desired final moisture levels of the honey chew mass. In process performing, the differential temperatures of the inlet to outlet hot water should show more than a 7 to 8° C. decrease, and that of cold water inlet to outlet should show minimum a 5° C. increase. The inlet moisture content of honey going in through the feeder pump and the moisture content of the honey coming out of the discharge pump are continuously checked at least at 5 minutes intervals in order to monitor evaporation progress.

A preferred embodiment of the invention has been described for purposes of clarity and example only. Many changes, substitutions and modifications to the described embodiment will become apparent to those having no more that ordinary skill in the art without thereby departing from the scope of this invention as defined by the following claims.

The invention claimed is:

1. A process for the preparation of chewable honey without loss of its nutritional values,
   characterized in that the process refers to a starting material consisting of raw honey with 19% water content,
   and in that the process consists of a plurality of repetitions of the following sequence of steps:
   a) preheating honey in an indirectly heated double jacketed balance tank and homogenizing said honey with a stirrer to obtain honey of uniform consistency with viscosity levels suitable for making the honey pumpable, the differential temperatures between inlet and outlet hot water used to indirectly heat the honey showing more than a 7° C. decrease;
   b) passing the honey through a sparkler filter with a 550 micron bed to give honey sparkling clarity;
   c) pumping the honey to a feeder tank;
   d) pumping the honey to a honey thin film evaporator (4), which works at a reduced pressure set to approximately 650 mm Hg, at a strictly controlled flow rate that ensures a desired heat transfer rate, this step reducing water content of honey by no more than 2%, the cooling water of the evaporator being maintained at 20-22° C. and 2 kg of pressure, the differential temperatures between outlet and inlet cold water used to condensate the evaporated moisture showing a minimum increase of 5° C.;
   e) checking at intervals of 5 minutes maximum the moisture content of honey going into the evaporator (4) and the moisture content of honey coming out of the evaporator (4) in order to check that no more than said 2% moisture is being extracted from honey in said step d), and checking continuously that honey temperature never exceeds 60° C.;

f) recycling the honey coming out of a discharge pump from said evaporator (4) to perform a subsequent sequence of steps a) to d), wherein the process is ended when the water content of honey reaches a predetermined value.

2. The process of claim 1, wherein said process comprises careful control of differential temperature of the inlet to outlet hot water; differential temperature of the inlet to outlet cold water; careful continuous control of inlet moisture content of raw honey going in through the feeder pump and moisture content of the honey coming out by the discharge pump; and wherein moisture extracted from honey in every set of steps a) to d) is not more than 2%, and product temperature is not allowed to go above 60° C.

3. The process of claim 1, further comprising an additional step of addition of a flavour between steps a) and b), said flavour being selected of additives, natural flavours, artificial flavours and nature identical flavours of strawberry, vanilla, coffee, chocolate, rose, cloves or any other such flavour.

4. The process of claim 1, further comprising an additional step of addition of a flavour between steps c) and d), said flavour being selected of additives, natural flavours, artificial flavours and nature identical flavours of strawberry, vanilla, coffee, chocolate, rose, cloves or any other such flavour.

5. The process of claim 1, further comprising a step of addition of a flavour when the process is ended when the water content is 5-15%, said flavour being selected of additives, natural flavours, artificial flavours and nature identical flavours of strawberry, vanilla, coffee, chocolate, rose, cloves or any other such flavour.

6. The process of claim 1, wherein the process is ended when the water content is 5-15%.

7. The process of claim 1, wherein the process is ended when the water content is 11-15%.

8. The process of claim 1, wherein the process is ended when the water content is 8-10%.

* * * * *